(12) United States Patent
Borgatti et al.

(10) Patent No.: US 7,350,008 B2
(45) Date of Patent: Mar. 25, 2008

(54) ELECTRONIC SYSTEM HAVING MODULAR EXPANSION FUNCTION FACILITIES

(75) Inventors: Michele Borgatti, Finale Emila (IT); Loris Giuseppe Navoni, Cernusco Sul Naviglio (IT); Pierluigi Rolandi, Monleale (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/508,533

(22) Filed: Aug. 23, 2006

(65) Prior Publication Data

US 2007/0067536 A1 Mar. 22, 2007

Related U.S. Application Data

(63) Continuation of application No. 10/036,185, filed on Dec. 28, 2001, now abandoned.

(30) Foreign Application Priority Data

Dec. 29, 2000 (EP) .................................. 00830874

(51) Int. Cl.
  *G06F 13/14* (2006.01)
  *G06F 1/00* (2006.01)
(52) U.S. Cl. ...................................... 710/301; 713/324
(58) Field of Classification Search ........ 710/301–302, 710/200–220; 713/324
See application file for complete search history.

(56) References Cited

U.S. PATENT DOCUMENTS

| | | | |
|---|---|---|---|
| 4,633,392 A | 12/1986 | Vincent et al. | |
| 4,908,792 A | 3/1990 | Przybyla et al. | |
| 5,167,024 A * | 11/1992 | Smith et al. | 713/322 |
| 5,247,633 A | 9/1993 | Nissimov et al. | |
| 5,269,011 A | 12/1993 | Yanai et al. | |
| 5,386,567 A | 1/1995 | Lien et al. | |
| 5,418,960 A | 5/1995 | Munroe | |
| 5,432,938 A | 7/1995 | Ohashi et al | |

(Continued)

FOREIGN PATENT DOCUMENTS

EP 0945792 9/1999

(Continued)

OTHER PUBLICATIONS

Silvero, et al.; "The Merlin Communications System,"; IEEE Journal on Selected Areas in Communications, vol. SAC-3, No. 4, Jul. 1985, pp. 584-593.

(Continued)

*Primary Examiner*—Paul R. Myers
(74) *Attorney, Agent, or Firm*—Gardere Wynne Sewell LLP

(57) ABSTRACT

An electronic system supporting modular expansion of its functions is of a type including a portable host electronic device associated with an expansion module adapted for quick-connect engagement and disengagement in/from the portable device. The expansion module includes a series of peripheral devices adapted to serve different classes of functions; a non-volatile memory storing information that pertains to configuring the different functions in the module; a re-configurable device adapted to establish connections, implement functional portions, and control all the system components; a control device adapted to cooperate with the host device in guiding the steps for re-configuring the whole system; and a software algorithm adapted to instruct the system to re-configure itself on which function and with which characteristics.

20 Claims, 2 Drawing Sheets

U.S. PATENT DOCUMENTS

| | | | |
|---|---|---|---|
| 5,496,617 A * | 3/1996 | Bullock, Sr. | 428/182 |
| 5,602,963 A | 2/1997 | Bissonnette et al. | |
| 5,615,344 A | 3/1997 | Corder | |
| 5,668,992 A | 9/1997 | Hammer et al. | |
| 5,727,231 A * | 3/1998 | Bartley et al. | 710/38 |
| 5,815,706 A | 9/1998 | Stewart et al. | |
| 5,875,349 A | 2/1999 | Cornaby et al. | |
| 5,933,652 A | 8/1999 | Chen et al. | |
| 5,944,831 A * | 8/1999 | Pate et al. | 713/324 |
| 6,029,211 A | 2/2000 | Nakashima et al. | |
| 6,038,551 A | 3/2000 | Barlow | |
| 6,085,982 A * | 7/2000 | Nakashima | 235/492 |
| 6,170,028 B1 * | 1/2001 | Wallach et al. | 710/302 |
| 6,211,697 B1 | 4/2001 | Lien et al. | |
| 6,219,796 B1 * | 4/2001 | Bartley | 713/320 |
| 6,307,281 B1 * | 10/2001 | Houston | 307/31 |
| 6,430,693 B2 * | 8/2002 | Lin | 713/322 |
| 6,516,377 B1 | 2/2003 | Brinkhus et al. | |
| 6,609,195 B2 | 8/2003 | Dover | |
| 6,647,434 B1 | 11/2003 | Kamepalli | |
| 6,662,302 B1 | 12/2003 | Garey | |
| 6,718,319 B1 | 4/2004 | Fisher, Jr. et al. | |
| 6,813,663 B1 * | 11/2004 | Brown | 710/104 |

FOREIGN PATENT DOCUMENTS

| | | |
|---|---|---|
| WO | WO-94/11802 | 5/1994 |
| WO | WO-99/33243 | 7/1999 |

OTHER PUBLICATIONS

Navoni, et al.; U.S. Appl. No. 10/035,542, filed Dec. 28, 2001.

* cited by examiner

ELECTRONIC SYSTEM HAVING MODULAR EXPANSION FUNCTION FACILITIES

CROSS-REFERENCE AND PRIORITY CLAIM

The present application is a continuation of U.S. application Ser. No. 10/036,185, filed Dec. 28, 2001, now abandoned, which claims priority from European Application for Patent No. 00830874.4 filed Dec. 29, 2000, the disclosures of which are hereby incorporated by reference.

BACKGROUND OF THE INVENTION

1. Technical Field of the Invention

The present invention relates to an electronic system with modular expansion of its functions.

2. Description of Related Art

As is well known, the capabilities afforded by palm-top computers is a broadening field in which a fresh potential for expansion has been brought by the development of supplementary modules, with different forms and functions, which add to the basic range of functions of such computers. The modules are designed for attachment and quick connection to portable electronic devices. The following models, among others, provide examples of such modules that are available commercially: Sony Memory Stick, Multimedia Card, Handspring Springboard, etc.

A supplementary module typically constitutes an expansion board providing a single additional function. Representative of such additional functions are an expanded memory, MP3 players, digital cameras, digital recorders, and GPS sets.

Briefly, a user who wishes to use a new function of his/her choice substitutes a board associated with the palm-top computer with a new one board.

Furthermore, some peripherals resident in these expansion boards may have a range of different functions that would more conveniently be consolidated in one board. This is the case, for example, with a multi-function digital camera designed for operation as a still camera or TV camera, to recognize features and track moving objects. The addition of a microphone to such a camera would be useful to supplement the camera with a function such as digital recording, voice recognition, or vocal commanding for automatic dictation.

Thus, supplementing a portable electronic device of any type with one or more additional functions would make the device more versatile and expand its potential. Currently available functions include a diary, calculator, communication function, and event scheduling tool. The portable electronic devices may include virtually any hand-held device, such as a palm-top computer, hand-held computer, mobile phone or business planner/organizer.

For example, a palm-top computer could possibly have a multimedia function board removably inserted therein for game playing, and another board providing the function needed for operating a business application.

A nontrivial feature of these palm-top electronic devices is the user interfacing mode. For the available functions to be readily set to work by the user, it is necessary that the user be enabled to grasp the essentials for their activation without having to go through lengthy training sessions. This is because, unlike standard computers, these devices are often utilized to interact with a distracted user, as may be the case of a cellular phone being operated in a crowded railway station, or are required to respond promptly, as when vocal or written notes are to be entered. Having to allow some minutes for the system to re-initialize, as is often necessary with desk-top computers, would be undesirable in such circumstances.

In this context, to be able to call an application or to enter a sequence of data by voice messages would certainly make such palm-top devices quicker and more convenient to use.

A prior approach to providing these features is disclosed in U.S. Pat. No. 5,602,963, where a so-called personal organizer is described that can be commanded vocally.

Additionally to ease activation and control, the industry of palm-top electronic devices has pursued expansion of the functions of a generic support system that affords a number of discrete functions within a limited area. However, a user's demand is that any added functions should be readily identifiable, quick to install, and operable at will with no overlap of the support system.

An approach of this kind is described in U.S. Pat. No. 5,432,938, which describes a method of automatically activating a functional expansion module by insertion into a computer unit.

The present invention is related to the above-outlined field, and primarily directed to provide a method of managing supplementary modules to a palm-top type of base device.

Another prior approach is described in U.S. Pat. No. 6,029,211, wherein a computer card incorporates a number of functions such as an additional memory, a modem, and circuitry for accessing a local area network (LAN). This card can be activated by an external event suitably addressing a configuration circuit portion known as Card Information Structure (CIS). However, the card is not intended for palm-top computers, and cannot be even adapted for such use.

A further prior approach comes from U.S. Pat. No. 6,038,551, which does relate to a multi-functional card but only in connection with one class of functions, such as secured transaction encoding and decoding. This card, however, does not provide for the system wherein the combined portable electronic device and the expansion module allow a user to activate different functions.

Based upon the foregoing, there is a need for a hand-held electronic device in which a variety of functions can be easily and efficiently utilized by a user.

SUMMARY OF THE INVENTION

Embodiments of the present invention overcome shortcomings in prior techniques and satisfies a significant need for a portable or hand-held electronic system in which the system functionality is relatively quickly re-configurable.

The embodiments of the present invention provides a modular expansion system whose modules incorporate a range of functions to be activated upon a user's request by re-configuring the system hardware. Re-configuration is achieved using software tools.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

The present invention will now be described more fully hereinafter with reference to the accompanying drawings in which an exemplary embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
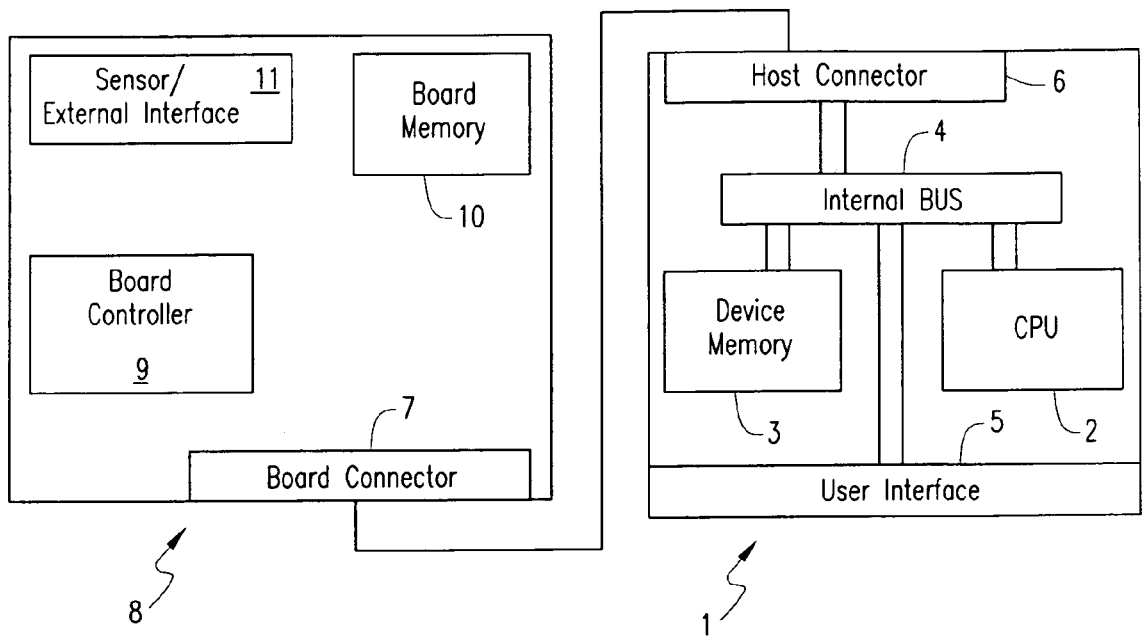
FIG. 1 is a block diagram showing schematically the a host electronic device and an expansion module according to an exemplary embodiment of the present invention.

With reference to the drawings, in particular to the system shown in FIG. 1, a portable host electronic device, such as a palm-top electronic device, is shown generally at 1 in schematic form.

The device 1 may be a wrist organizer, a cellular phone, or a palm-top computer, such as the "Visor" model sold by Handspring, which comes with the OS operating system installed. It is understood that device 1 may be virtually any type of portable or hand-held electronic device that may be manipulated by a user.

The device 1 includes a microprocessor or CPU 2 and a memory unit (device memory) 3. These internal components of electronic device 1 may be interconnected by an internal bus 4, which may also provide connectivity to a user interface 5.

The device 1 may further include a host connector 6, which is adapted for quick engagement with a mating board connector 7 on an expansion module 8.

The expansion module 8 is an expansion board adapted to expand the functions of the portable host device 1 when connected therewith, and adapted for releasable connection to the device 1 by plugging the connectors 6 and 7 together. The expansion module 8 may include at least a control unit (board controller) 9, such as a microcontroller, and a memory unit (board memory) 10. Ambient sensors/external interface 11 may also be provided in the expansion module 8. Components 9, 10 and 11 may be interconnected by an internal bus of the expansion module 8 (not shown), which may be implemented by printed circuit tracks on the expansion board.

To better explain the various aspects of the present invention, the host device 1 will be assumed to be a generic palm-top computer for exemplary purposes only. Expansion module 8 will be treated as a module which adapts the host device 1 for accepting vocal commands, also for exemplary purposes only. It is understood that host device 1 may be other types of electronic devices and that expansion module 8 may provide functionality other than or in addition to accepting voice commands.

Figure 2:
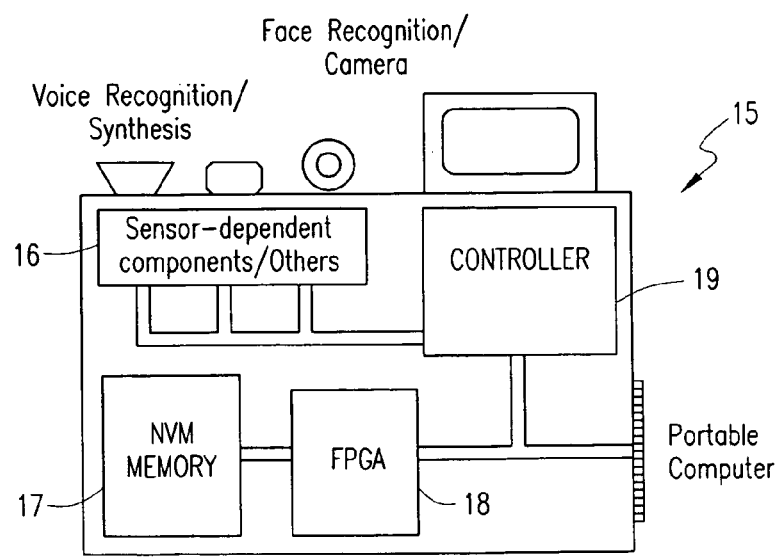
FIG. 2 schematically details the construction of the expansion module of FIG. 1.

In this exemplary description, the expansion module 8 includes a board 15 (see, FIG. 2) that may have the following components:
- a series of one or more devices (sensor dependent components/others) 16 directed to serve different classes of functions (e.g., a series of one or more sensors, signal processors, converters, etc.), hereinafter referred to as the peripherals;
- a non-volatile memory 17 storing information that pertains to configuring the different functions in the board 15;
- a re-configurable device 18, such as of the programmable or FPGA type, which can be adapted to establish connections, implement functional portions, and control the system components/devices 16;
- a control device (controller) 19 adapted, in cooperation with the host device 1, to control the steps for re-configuring the whole system (i.e., the host 1 and module 8); and
- a software algorithm adapted to instruct the whole system to re-configure itself with a specified function and characteristics.

The board 15 may be operated by a method that, on request by the user, allows the board to be re-configured in real time or substantially real time to produce a desired function.

Note should be made of that the board components may be fabricated in one chip, e.g., using a System-on-Chip (SoC) technology, or alternatively, may be divided among a plurality of integrated circuit devices. Furthermore, it is understood that the board structure can be scaled with respect to: the number of available peripherals; the size of the re-configurable devices, which may settle or determine the number and types of functions that can be activated at any one time; and the size of the non-volatile memory 17, which may settle or determine the availability of more complex drivers.

The system, according to the exemplary embodiment of this invention, resides in part that the system does not provide a mere aggregate of wired functions from which the user is prompted to make his/her choice. Instead, the system comprises a series of peripherals 16 and (at least one) set of re-configurable blocks 18 which modify the system hardware to produce a desired function, irrespective of whether the desired function is pre-defined in the board 15 or is requested at run-time.

A new function provided by the system may be activated by the following sequence. Initially, assume a multi-functional board 15 is connected physically to the host device 1 using a PCMCIA connection, for example. In addition, different configurations can be activated within board 15. Images or characteristics may be stored in the system non-volatile memory 17, or alternatively can be dumped off the host device through a suitable communication channel. The operating system of the host device 1 is able, through a suitable API (Application Programming Interface), to signal requests from the current application to the board 15, and to manage the communication of data between host device 1 and board 15.

A request to activate a new function may be made by the user, or the user responds to the host device 1 changing its state. For instance, upon a new application being activated that requires a different interface 11, the host device 1 controls the expansion board 15 to activate that interface. The control device 19 and stored drivers are activated on request to match the function(s) requested. This step comprises the following sub-steps:
- verifying the request, to check for correctness and consistency with the functions provided by the board 15;
- selecting and activating peripherals and other affected components, and de-activating the unnecessary components to also afford energy savings;
- configuring the communication buses, and resetting the board 15 to suit the functions requested;
- addressing the non-volatile memory 17 space that contains the instructions to execute the drivers that pertain to the function requested; and
- signaling completion of the re-configuration.

The software algorithm that is resident in the host device 1 (or if stored in a memory of the expansion board, capable of being processed by the host device 1) is activated to set the communication protocol, and signal the availability of the requested function to the current application (or directly to the user).

Consider now an expansion board 15, such as a board implemented using SoC technology, whereby the exemplary vocal command recognition or voice synthesis function can be actuated. The board 15 may include a voice synthesizing peripheral (or converter); a voice recognition peripheral (as well as a microphone sensor); a microcontroller; a volatile memory, such as a random access memory (RAM); a non-volatile memory 17, such as a flash memory; and one or more programmable devices 18, such as a FPGA device or the like. This board 15 may fit or be otherwise inserted into an electronic device 1, such as a palm-top computer. Upon insertion of board 15 into electronic device 1, the resident applications may be read and the added functions provided by board 15 may be verified to be applicable to the resident applications.

Next, the system may wait for a request to re-configure from the user or from within the system. Once the user or system request is executed, the board 15 may activate the processor 2 and re-configurable devices according to a currently activated application, thereby making the functions provided by board 15 available. According to the application, or within the application in different modules, it may happen that only the voice synthesizing function (as in the instances of an e-book or a mail reader), or only the vocal command acquiring function (as in the instance of a game), or both are requested. In the latter case, an intermediate status could be considered, e.g., with FPGAs configured for either occurrences and adapted to switch between functions on each request from the application.

Figure 3:
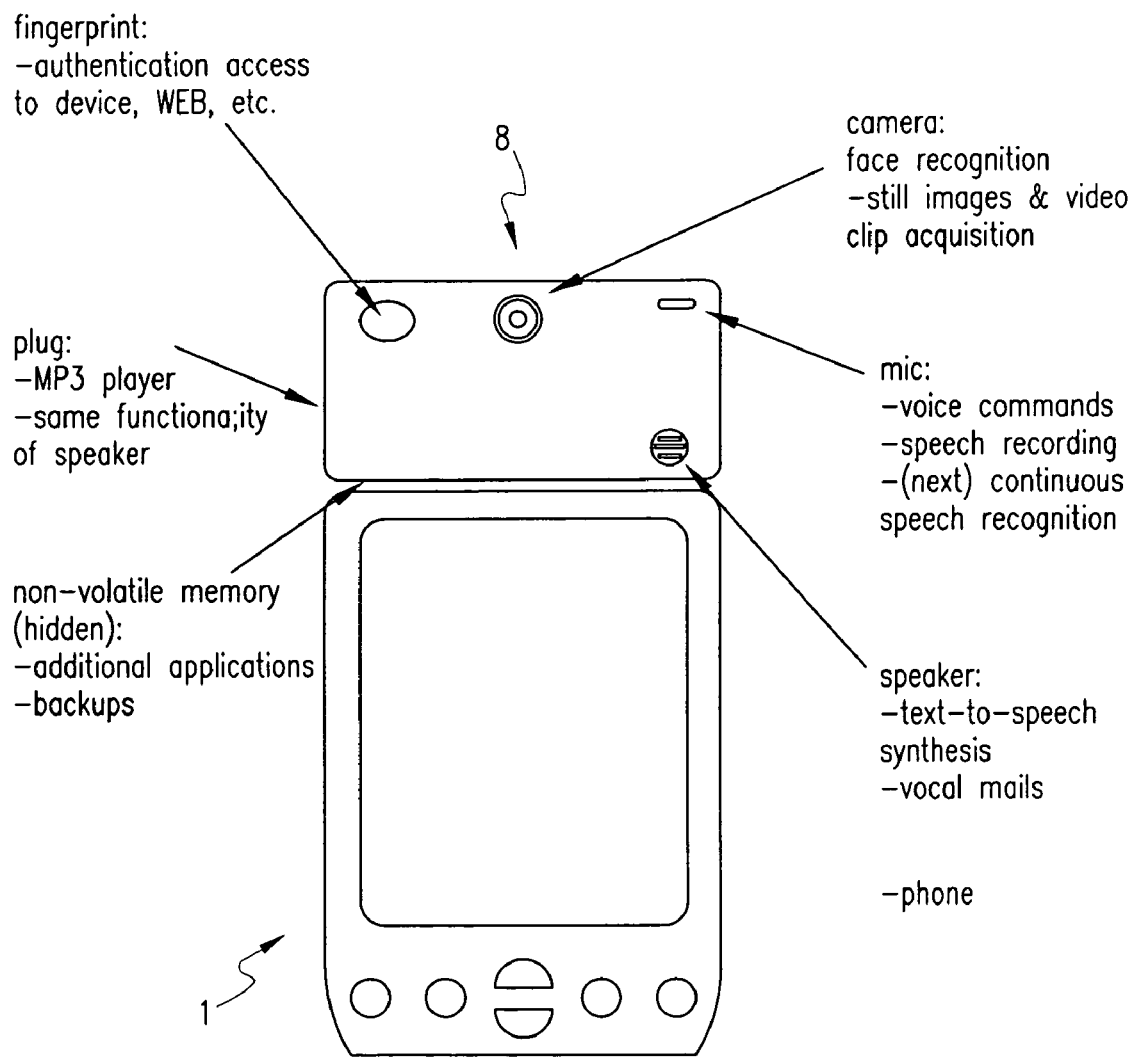
FIG. 3 is a front elevational view of a system according to the exemplary embodiment of the present invention.

If the current application is designed to use these functions provided by board 15, activation would occur substantially at once. If not, an interaction of the board 15 with the host processor 2 may be established to enable the application structures to serve as function activators. In this case, according to FIG. 3, the vocal command function could be activated by merely inserting a pertinent board 15 or module 8 into the expansion slot disposed at the top of host device 1. The board 15 itself would be able to verify through the applications where it can set its functions to work, configure the system to accept vocal commands, for example, and control the applications of device 1 consistently with the vocal commands imparted without the user having to enter any special configuration operations.

Also, it would be possible to store both the configuration and the current state, such that the system may be quickly set up at the next insertion of a board 15.

Removal and replacement of the above board with another having a different function, such as a feature recognizer, initiate a re-configuring step according to the characteristics of the new board 15.

The invention being thus described, it will be obvious that the same may be varied in many ways. Such variations are not to be regarded as a departure from the spirit and scope of the invention, and all such modifications as would be obvious to one skilled in the art are intended to be included within the scope of the invention. Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An electronic system, comprising:
   a portable host device having a connector and operable to execute user applications; and
   an expansion module adapted for quick-connect engagement in and disengagement from the portable host device via the connector, comprising:
     a plurality of peripheral devices each adapted to perform a certain function;
     a non-volatile memory for storing instructions to execute drivers pertaining to the functions of the peripheral devices; and
     a control device operable upon connection of the expansion module with the portable host device to read a certain user application resident on the portable host device and verify which peripheral device functions supported by the expansion module are applicable to the read resident application and, responsive thereto, reconfigure the expansion module in support of the certain user application by selectively activating the peripheral devices to perform the identified pertinent functions, addressing the non-volatile memory for the stored instructions to execute drivers pertaining to the identified pertinent functions of the selectively activated peripheral devices and signaling the portable host device that reconfiguration is completed.

2. The system of claim 1, wherein the expansion module further comprises a re-configurable device whose circuitry may be configured by the control device in connection with reconfiguration of the expansion module in support of the certain user application to establish communications connections between the selectively activated peripheral devices and the portable host device, implement functional portions, and control operation of the selectively activated peripheral devices.

3. The system of claim 2, wherein the re-configurable device comprises a field programmable gate array including programmable circuitry.

4. The system of claim 1, wherein the expansion module further comprises a re-configurable device whose circuitry may be configured by the control device in connection with reconfiguration of the expansion module in support of the certain user application to configure communications buses for the selectively activated peripheral devices and reset the expansion module to suit the identified pertinent functions performed by the selectively activated peripheral devices.

5. The system of claim 1, wherein the peripheral devices include sensors.

6. The system of claim 1, wherein the peripheral devices include signal processing elements.

7. The system of claim 1, wherein the non-volatile memory stores images of different configurations of the peripheral devices.

8. A method, comprising:
   reading by an expansion module of user applications resident on a portable host device in response to connection of the expansion module to the portable host device, wherein the expansion module includes a plurality of peripheral devices each adapted to perform a certain function and a non-volatile memory for storing instructions to execute drivers pertaining to the functions of the peripheral devices;

verifying by the expansion module of which functions performed by its peripheral devices are pertinent to a certain user application resident on the portable host device; and reconfiguring the expansion module in support of the certain user application by:
  selectively activating the peripheral devices to perform the identified pertinent functions,
  addressing the non-volatile memory for the stored instructions to execute drivers pertaining to the identified pertinent functions of the selectively activated peripheral devices, and
  signaling the portable host device that reconfiguration is completed.

9. The method of claim 8, wherein identifying further comprises verifying that a request from the portable host device to perform certain functions at the expansion module is consistent with functions that are capable of being provided by the peripheral devices of the expansion module.

10. The method of claim 8, wherein selectively activating comprises activating peripheral devices within the expansion module supporting the identified pertinent functions, and deactivating peripheral devices within the expansion module that are not pertinent to the certain user application.

11. The method of claim 8, wherein reconfiguration further comprises configuring circuitry in support of the certain user application so as to establish communications connections between the selectively activated peripheral devices and the portable host device, implement functional portions, and control operation of the selectively activated peripheral devices.

12. The method of claim 8, wherein reconfiguration further comprises configuring circuitry in support of the certain user application so as to configure communications buses for the selectively activated peripheral devices and reset the expansion module to suit the identified pertinent functions performed by the selectively activated peripheral devices.

13. An expansion module adapted for quick-connect engagement in and disengagement from a portable host device, comprising:
  a plurality of peripheral devices each adapted to perform a certain function;
  a non-volatile memory for storing instructions to execute drivers pertaining to the functions of the peripheral devices; and
  a control device operable upon connection of the expansion module with the portable host device to read a certain user application resident on the portable host device and verify which peripheral device functions supported by the expansion module are applicable to the read resident application and, responsive thereto, reconfigure the expansion module in support of the certain user application by selectively activating the peripheral devices to perform the identified pertinent functions, addressing the non-volatile memory for the stored instructions to execute drivers pertaining to the identified pertinent functions of the selectively activated peripheral devices and signaling the portable host device that reconfiguration is completed.

14. The module of claim 13, wherein the expansion module further comprises a re-configurable device whose circuitry may be configured by the control device in connection with reconfiguration of the expansion module in support of the certain user application to establish communications connections between the selectively activated peripheral devices and the portable host device, implement functional portions, and control operation of the selectively activated peripheral devices.

15. The module of claim 14, wherein the re-configurable device comprises a field programmable gate array including programmable circuitry.

16. The module of claim 13, wherein the expansion module further comprises a re-configurable device whose circuitry may be configured by the control device in connection with reconfiguration of the expansion module in support of the certain user application to configure communications buses for the selectively activated peripheral devices and reset the expansion module to suit the identified pertinent functions performed by the selectively activated peripheral devices.

17. The module of claim 13, wherein the peripheral devices include sensors.

18. The module of claim 13, wherein the peripheral devices include signal processing elements.

19. The module of claim 13, wherein the non-volatile memory stores images of different configurations of the peripheral devices.

20. An electronic system, comprising:
  a portable host device having a connector and operable to execute user applications; and
  an expansion module adapted for quick-connect engagement in and disengagement from the portable host device via the connector, comprising:
    a plurality of peripheral devices each adapted to perform a certain function;
    a non-volatile memory for storing instructions to execute drivers pertaining to the functions of the peripheral devices; and
    a control device operable upon connection of the expansion module with the portable host device to read a certain user application resident on the portable host device and verify which peripheral device functions supported by the expansion module are applicable to the read resident application and, responsive thereto, reconfigure the expansion module in support of the certain user application by selectively activating the peripheral devices to perform the identified pertinent functions, addressing the non-volatile memory for the stored instructions to execute drivers pertaining to the identified pertinent functions of the selectively activated peripheral devices and signaling the portable host device that reconfiguration is completed.

* * * * *